July 20, 1965 R. W. TRIPP 3,196,256

TAPE DECODING MULTIPLE SWITCH

Filed May 22, 1961 10 Sheets-Sheet 1

ROBERT W. TRIPP
INVENTOR

BY W E Beatty
ATTORNEY

ROBERT W. TRIPP
INVENTOR

BY W E Beatty

ATTORNEY

TAPE DECODING MULTIPLE SWITCH

Filed May 22, 1961 10 Sheets-Sheet 3

ROBERT W. TRIPP
INVENTOR
BY W E Beatty
ATTORNEY

ROBERT W. TRIPP
INVENTOR

BY W. E. Beatty
ATTORNEY

TAPE DECODING MULTIPLE SWITCH

Filed May 22, 1961 10 Sheets-Sheet 5

ROBERT W. TRIPP
INVENTOR

BY W E Beatty
ATTORNEY

TAPE DECODING MULTIPLE SWITCH

Filed May 22, 1961 10 Sheets-Sheet 6

STATION 17 SHOWN IN FIG. 2.

| SLIDE \ STATION NO. | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | X | 0 | X | 0 | X | 0 | X | 0 | X | 0 | | 0 | 0 | 0 | X | 0 | 0 | X | 0 | X |
| 2 | 0 | X | X | 0 | 0 | X | X | 0 | 0 | 0 | | X | 0 | 0 | 0 | X | 0 | X | 0 | X |
| 3 | 0 | 0 | 0 | X | X | X | X | 0 | 0 | 0 | | X | 0 | 0 | X | 0 | 0 | X | 0 | 0 |
| 4 | 0 | 0 | 0 | 0 | 0 | 0 | 0 | X | X | 0 | | X | 0 | 0 | 0 | 0 | 0 | X | 0 | X |
| 5 | 0 | 0 | X | 0 | X | X | 0 | 0 | X | 0 | | X | X | 0 | X | X | 0 | X | 0 | 0 |
| 6 | 0 | 0 | 0 | 0 | 0 | 0 | 0 | 0 | 0 | X | | X | X | 0 | X | X | 0 | X | 0 | X |
| 7 | 0 | 0 | 0 | 0 | 0 | 0 | 0 | 0 | 0 | 0 | | 0 | X | X | X | 0 | 0 | X | 0 | X |
| 8 | 0 | 0 | 0 | 0 | 0 | 0 | 0 | 0 | 0 | 0 | | 0 | 0 | 0 | 0 | 0 | X | ⊗ | 0 | 0 |
| CHARACTER | 1 | 2 | 3 | 4 | 5 | 6 | 7 | 8 | 9 | 0 | | TAB | + | - | E | S | CR | DELETE | BLANK | RE-READ |

ROBERT W. TRIPP
INVENTOR
BY W E Beatty
ATTORNEY

TAPE DECODING MULTIPLE SWITCH

ROBERT W. TRIPP
INVENTOR
BY W E Beatty
ATTORNEY

TAPE DECODING MULTIPLE SWITCH

Filed May 22, 1961 10 Sheets-Sheet 8

ROBERT W. TRIPP
INVENTOR
BY W E Beatty
ATTORNEY

CAM ALIGNMENT SHOWN AT 180°

ROBERT W. TRIPP
INVENTOR.

BY W. E. Beatty

ATTORNEY

July 20, 1965 R. W. TRIPP 3,196,256

TAPE DECODING MULTIPLE SWITCH

Filed May 22, 1961 10 Sheets-Sheet 10

ROBERT W. TRIPP
INVENTOR.

BY W E Beatty

ATTORNEY

United States Patent Office 3,196,256
Patented July 20, 1965

3,196,256
TAPE DECODING MULTIPLE SWITCH
Robert W. Tripp, Eastchester, N.Y., assignor to Inductosyn Corporation, Carson City, Nev., a corporation of Nevada
Filed May 22, 1961, Ser. No. 123,915
4 Claims. (Cl. 235—61.11)

This invention relates to a tape decoding multiple switch which provides contact closures corresponding to a coded combination of holes in a tape.

Previous equipment has utilized tape readers which merely provided contact closures corresponding to one of a plurality of possible punched holes in a tape and the decoding required was performed by a complicated relay system.

An object of the invention is to avoid the use of the prior complicated relay system to provide decoded signals from the position of sensing pins in a tape reader in a completely mechanical manner, the decoding being effected by a mechanical motion between the sensing pins and the contact closure.

Another object of this invention is to provide a decoding mechanism directly attachable to a tape reader to form a part thereof so that the multiple signals necessary for the control of an automatic machine tool are provided from the coded program on a standard punched tape.

Other objects of the invention are to provide an improved tape decoding multiple switch having the advantages of simplicity, reliability, economy and versatility.

The present application discloses a tape decoding multiple switch which could be directly applied to machine tool control systems disclosed in Patents 2,839,711, 2,875,390, 2,849,168 and 2,843,811.

A feature of the invention is the provision of a translator slide for each sensing pin, with a sliding catch between each slide and its pin for holding the slide in cocked or idle position against the action of a spring when the pins are held in retracted position by the blank tape, the slides moving to different combinations of active positions in accordance with the release of the pins by the code punched in the tape, a separate means being provided for translating each such active position combination into a signal representative of the corresponding code. Means are also provided for restoring the translator slides to cocked or idle position.

A further object of the invention is to translate the code represented by a plurality of holes in tape or the like, into the movement of a certain number of slides such as 8, to a larger number of relative positions, such as 19, each such relative position having a station having an individual actuating member selectively operated, at the code selected station, to the exclusion of the other actuating members, by the conjoint action of all of the slides, the slides having active and passive portions, the active portions being aligned to provide a passage extending laterally through all slides for the actuating member at the station selected according to the code, to the exclusion of the other stations where the active portions are misaligned.

For further details of the invention, reference may be made to the drawings, wherein—

FIG. 1 is a vertical longitudinal sectional view of a tape decoding multiple switch according to the present invention, showing the relative positions of the cams, actuating arms, translator slides, contact slides, tape and the like at a position in the rotary cycle of the tape reader shaft where it is possible to read and decode any holes punched in the tape. In the case shown in FIG. 1, the decoding action is reading "blank" tape, the sensing pins being in retracted position.

FIG. 2 is a sectional view of a detail of the prior well known mechanism on the tape reader showing the actuation of the sprocket advance mechanism and the operation of the "no tape" switch.

FIG. 3 is a sectional view showing the same components as FIG. 1 except that the tape reader shaft has rotated ½ turn and is at the so-called 0° position, the broken lines showing the actuated position of the sliding catch when the sensing pin encounters a hole in the tape. FIG. 3A shows the relative position of the translator slides when in idle position for blank tape and FIG. 3B shows their relative positions for the coded signal "CR."

Figure 13:
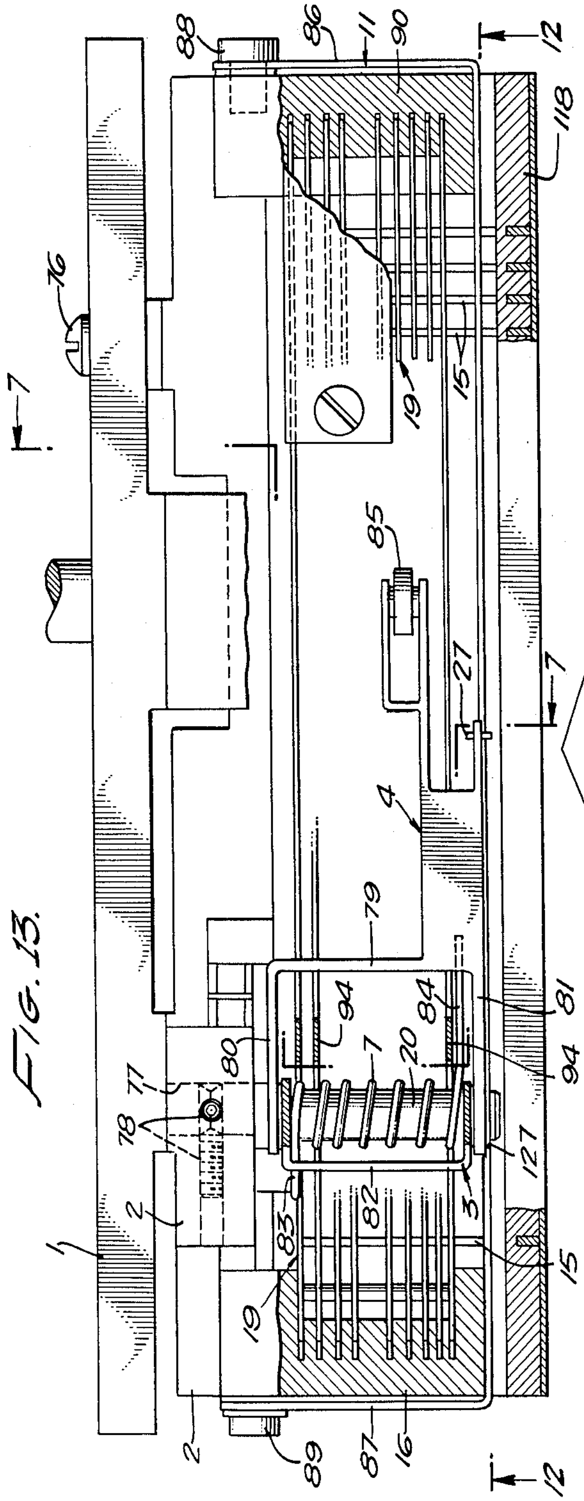
FIG. 13 is a top view of the complete assembly showing in addition the tape reader shaft and front plate of the tape mechanism, parts being shown in section.
Figure 17:
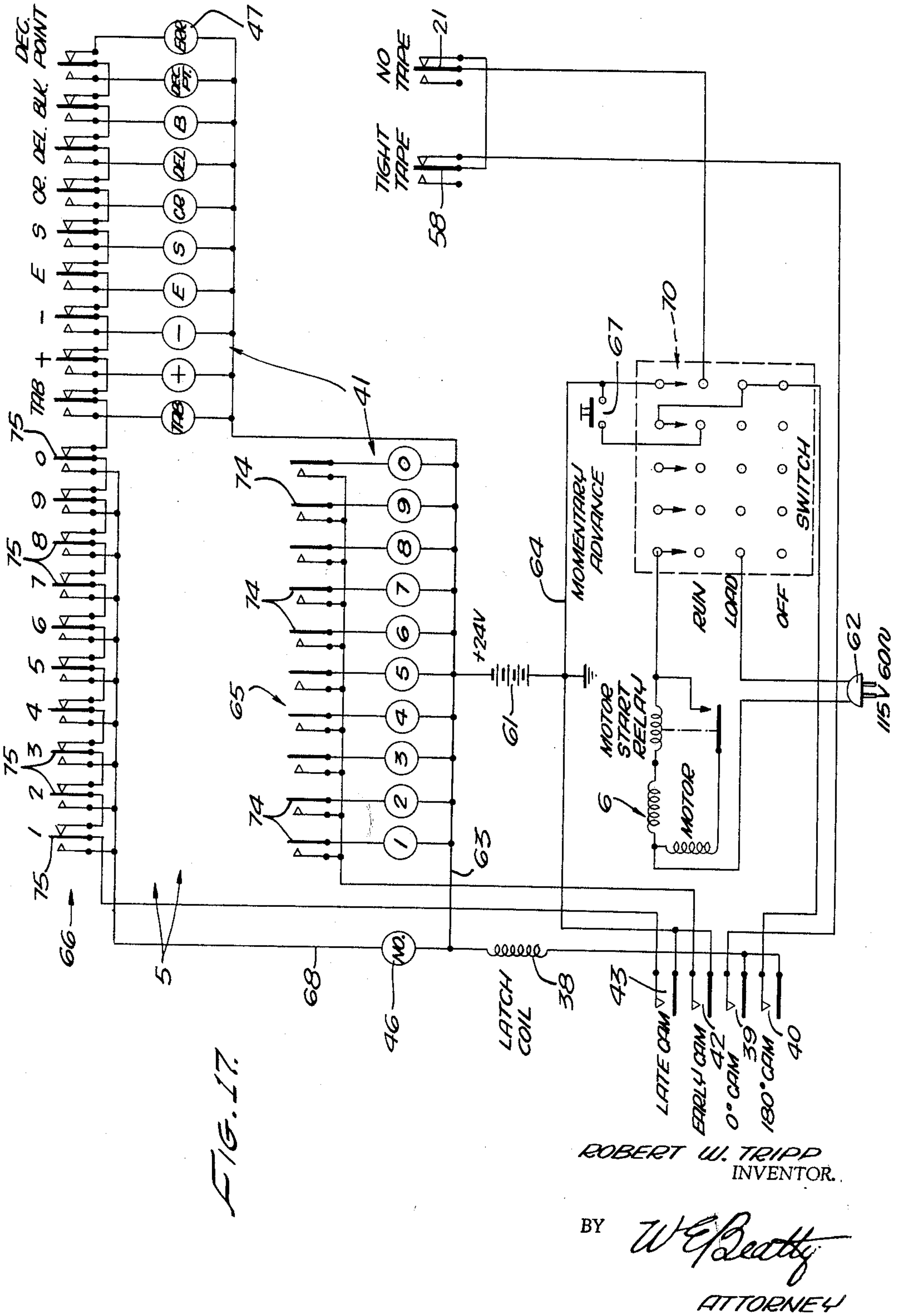
FIG. 17 is a schematic electrical circuit useful in explaining the invention, showing lamps as typical of signal circuits or devices, the stacking switches shown corresponding to FIG. 16 except that the single throw switches for the stations "tab" etc. have been omitted in FIG. 17.

Four of the cams in FIG. 13 only control contacts as shown in FIG. 17.

Figure 12:
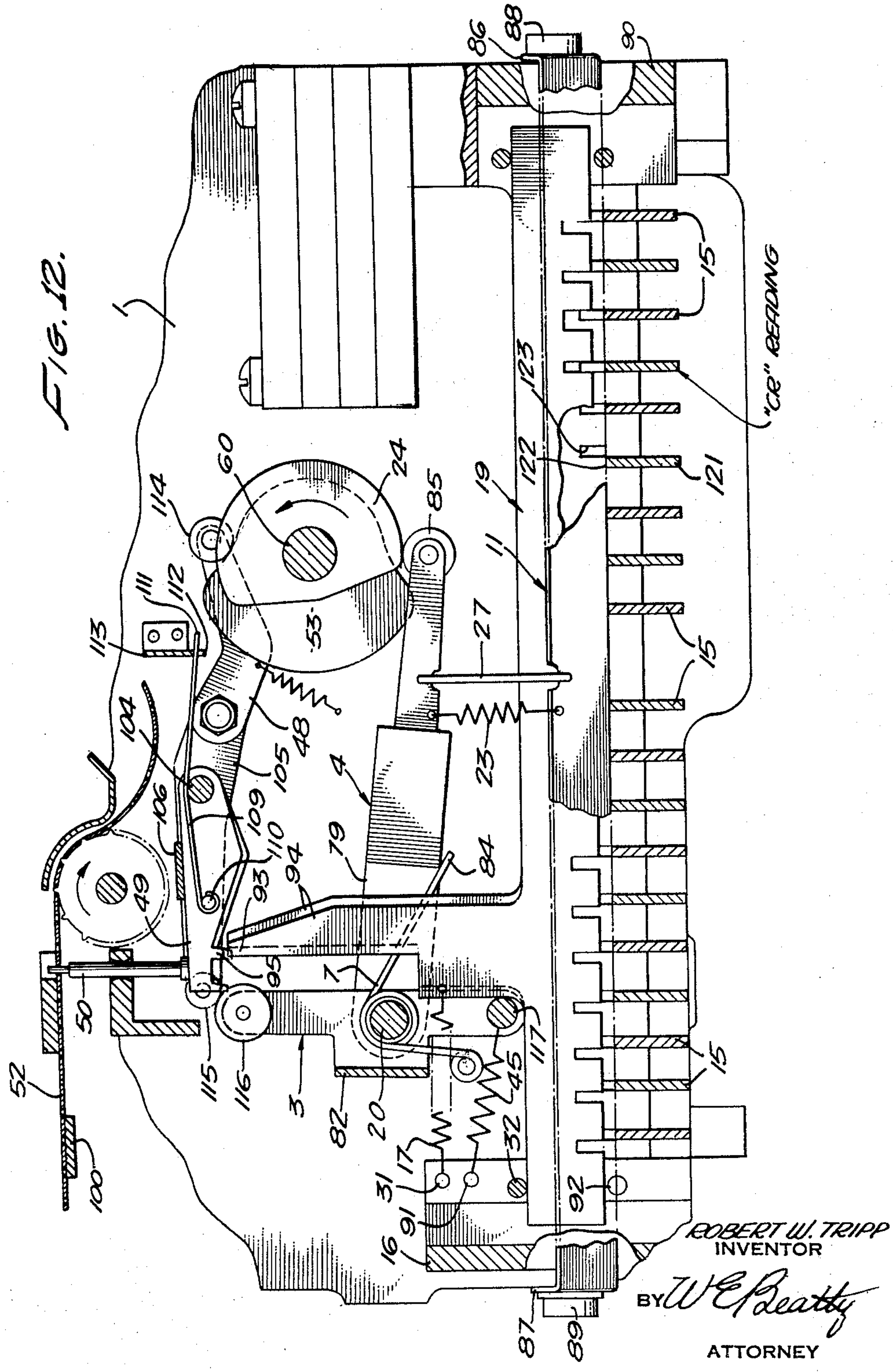
FIG. 12 is a view corresponding to FIGS. 4, 5 and 6, showing the translator slides in position to read "CR," with the restorer frame still holding the contact slides out of the notches due to the action of the restorer arm. This is a sectional view on line 12—12 of FIG. 13.

Referring to the general assembly view in FIG. 13, a rectangular plate 1 extends vertically, the edge view appearing in FIG. 13, this plate serving as a base. To this base plate 1 is fixed, by screws 76 a main support block 2 which has bearing holes for the various shafts and a socket 77 for the inner end of an eccentric pivot shaft 20 held in adjusted rotatable position by screws like 78. The inner end 79 of the restorer actuator assembly 4 has spaced arms 80 and 81 rotatably mounted on pivot shaft 20. The intermediate portion 82 of reset rocker assembly 3 also has a pivot support on pivot shaft 20, see FIGS. 1, 3 and 7. Referring to FIGS. 12 and 13, the arms 80 and 81 at the inner end of restorer arm 4 and the opposite sides of the reset rocker 3 have bearing holes in which the shaft 20 extends, being retained in position by a retainer 127 in a groove on the outer end of shaft 20. Mounted around pivot shaft 20 between arms 80 and 81 is a coil spring 7 having a fixed end 83 see FIG. 12 and a free end 84 see also FIG. 13, which bears upwardly on the under side of restorer actuator assembly 4, to maintain its roller 85 which is on the outer end of assembly 4, against the restorer cam 24.

Figure 18:
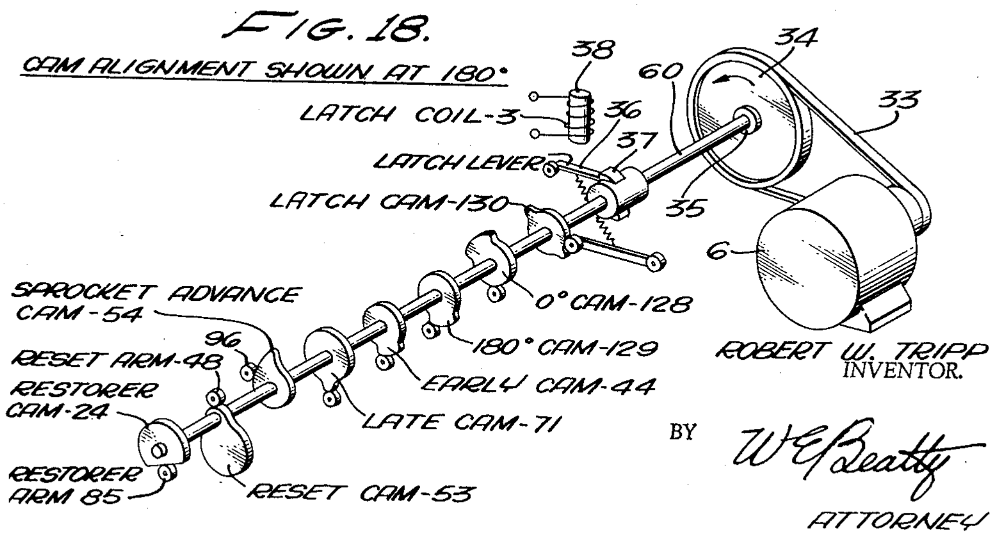
FIG. 18 is a schematic perspective view showing the relative positions of the tape reader motor drive shaft and associated cams necessary for the operation of both the prior well known tape reader and the decoder according to the present invention. The shaft position is shown at the read or 180° position.

The main drive shaft 60, on which various cams are mounted, see FIG. 18, has a bearing support in the main support block 1, and the motor 6 in FIG. 17 is suitably arranged behind plate 1. The restorer frame 11 see FIG. 13, is U shaped and the ends of its legs 86 and 87 are pivotally mounted on the end combs 16 and 90 as shown at 88 and 89.

Figures 3, 3A, 3B:
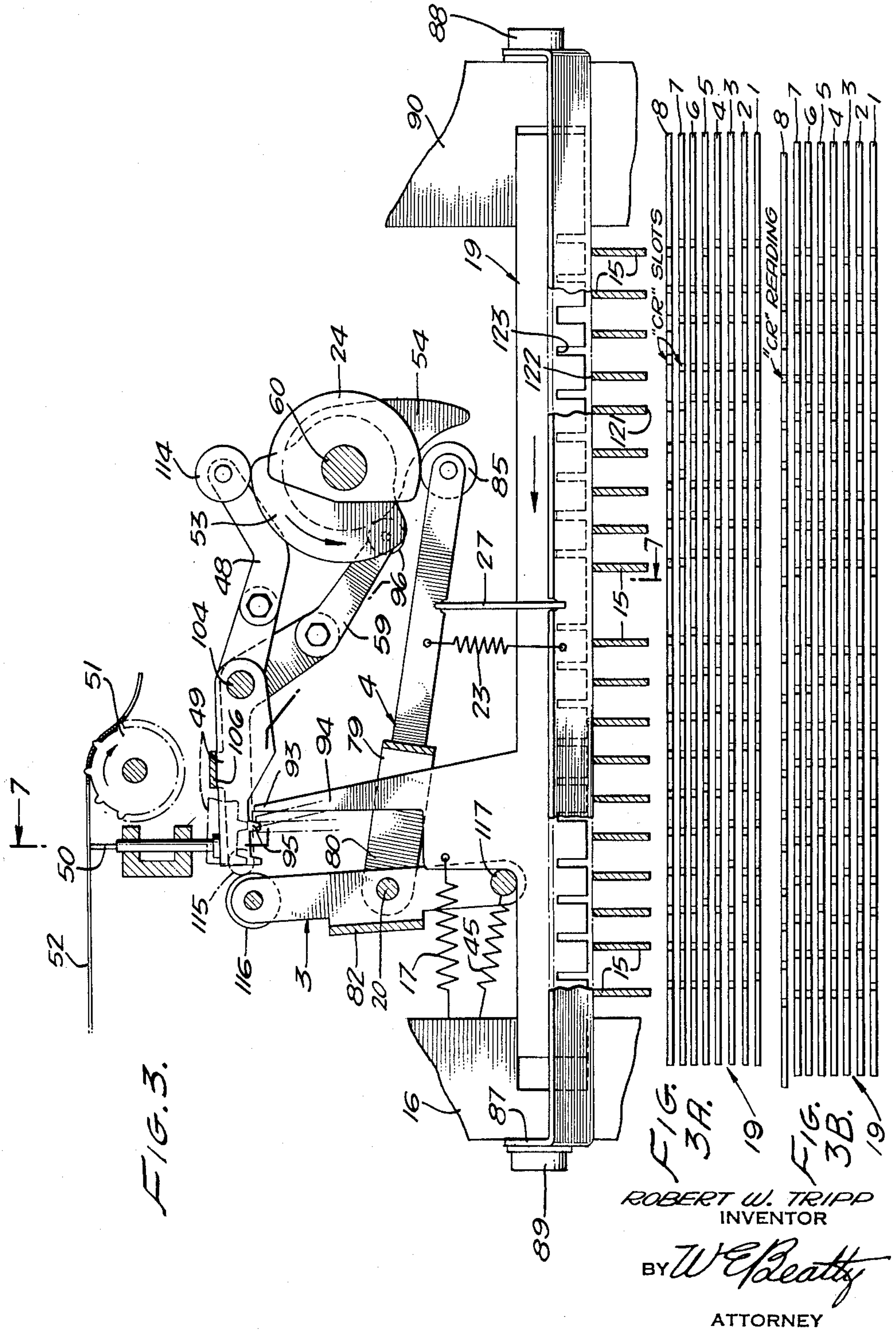
Figure 14:
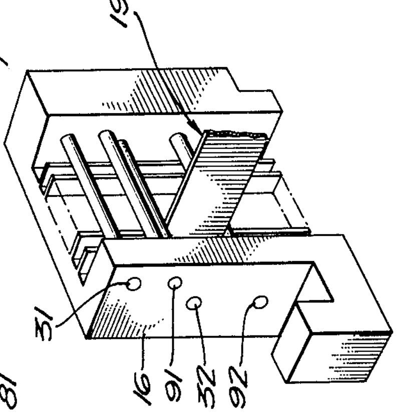
FIG. 14 is a perspective view of an end comb showing guide pins for vertical location of the translator slides and comb slots for horizontal registry of translator slides. It also shows horizontal pins 31 for securing translator springs.

Fixed to the opposite ends of the main support 2 are the end combs 16 and 90, comb 16 as shown in FIG. 14 having dowel pins 31 and 91 serving as anchors for the springs 17 and 45, FIG. 3. Each of the combs 16 and 90 has spaced dowel pins 32 and 92 which guide the top and bottom edge of the eight translator slides in the group 19, a typical translator slide 19' appearing in FIG. 10.

Each slide in the group 19 moves to the left the width of an "0" notch which is the same as the width of an "X" notch in the lower edge of the slides at each of the 20 stations. The "0" and "X" slots are arranged according to a code, see FIG. 11. The code "X" inside of a circle in FIG. 11 at station #18 for slide #8 indicates that this slide has a notch at both the "0" and "X" positions, this slot being double the width of either one of the separate slots.

Figures 1, 2:
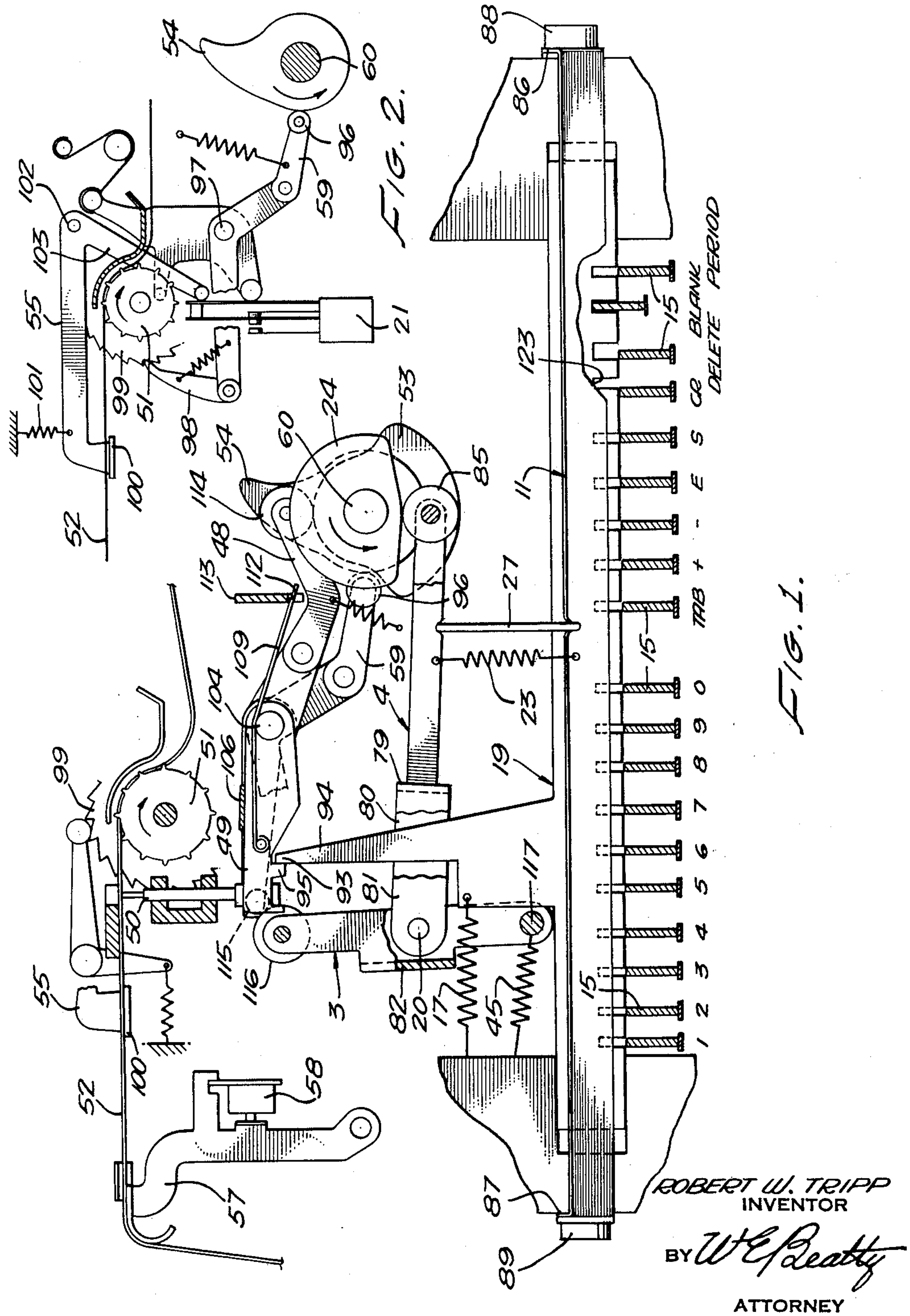

FIG. 3A shows the condition with all eight of the slides in the group 19 in the idle position to the right, cocked against the action of their springs 17 by the sear or sliding catch 93 FIG. 1, one catch member being at the upper end of an upright extension 94 on each slide 19 and the other catch member 95 being on the lower side of an interposer arm 49. Upwardly projecting from the outer end of each interposer arm 49 is one of the sensing pins in the group 50 for the tape 52.

Figures 10, 11:
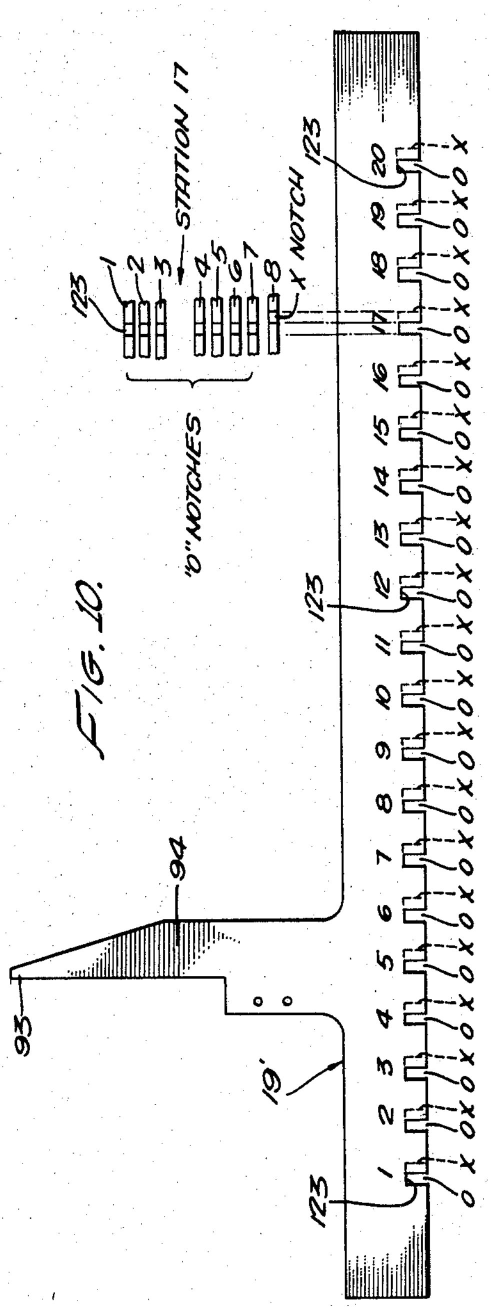
FIG. 10 is an enlarged view in elevation of a typical translator slide showing the positions of 20 notches and the relation of a "0" notch to an "X" notch.
FIG. 11 is a table showing the coding required (notch positions) for each of 8 translator slides at all of 20 stations.

In FIG. 11, the only vertical column which has all all "0's" is station 19 and this represents blank tape having no holes as also shown in FIG. 3A. To light lamp 1 in FIG. 17, or to energize a control circuit corresponding to it, as shown in FIG. 11 a hole in the tape is needed for pin number 1 to move slide 1 to the left whereby the "X" slot in slide 1 will be in alignment with the "0" slots in the remaining slides at station 1. The slots will be out of alignment at all other stations.

FIG. 11 shows that "CR" station 17, or corresponding lamp or control circuit is activated by moving slide number 8 to the left, this being accomplished by a hole in the tape 52 at position 8. FIG. 3B shows that under this condition, all of the "0" and "X" slots are staggered except at the "CR" station where they form a straight slot.

Figure 8:
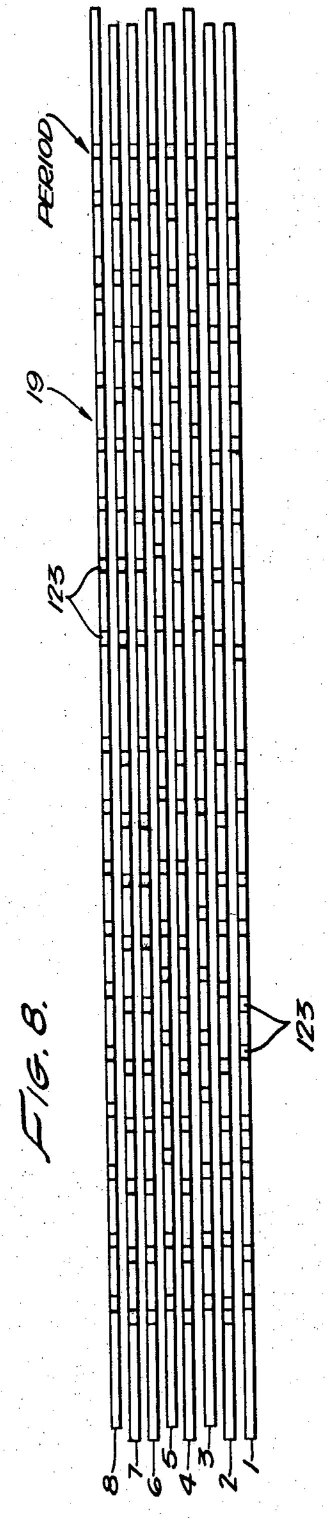
FIG. 8 is a bottom view of the translator slides, similar to the view of FIG. 3B except that it shows their relative positions when reading "period."
Figure 9:
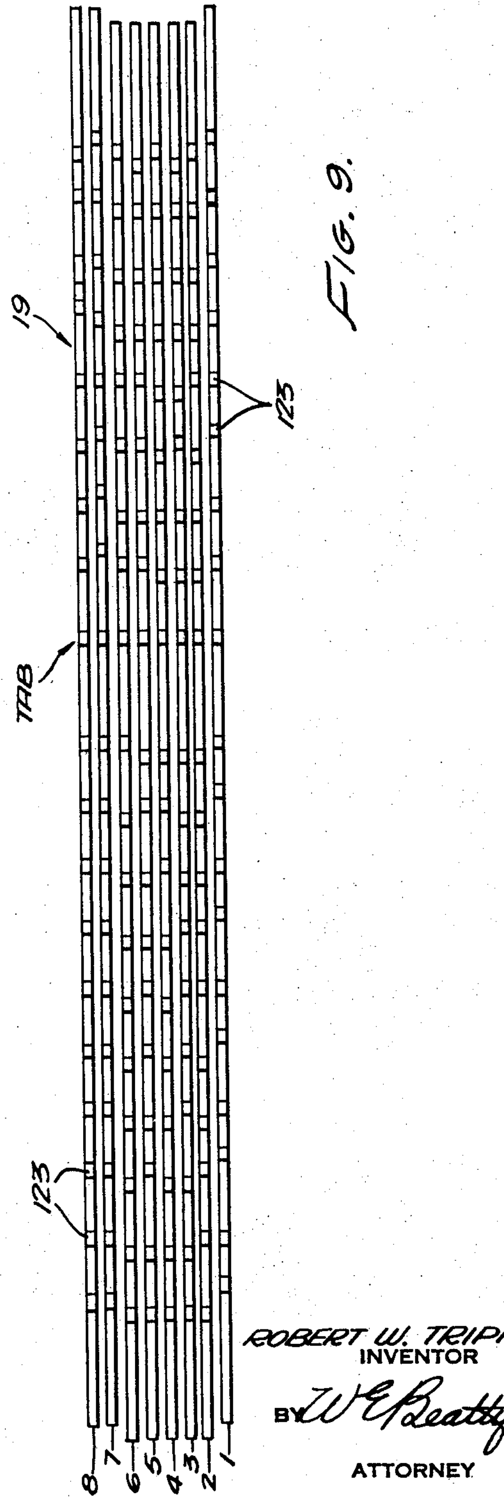
FIG. 9 is a view similar to FIG. 8 except that it shows the relative positions of the translator slides when reading "tab."

FIG. 8 shows the relative position of the translator slides 19 with "0" and "X" slots in alignment at station 20 when reading "Period," FIG. 9 showing this when reading "Tab" at station 12. There is one translator slide in the group 19 for each hole position in the tape, eight slides and hole positions being illustrated by way of example.

Referring to FIG. 1, the tape reader drive shaft 60 is shown stopped at the 180° position. The mechanism is in position to read holes in the tape, as the reset arm 48, which engages the reset cam 53, has rotated to its extreme clockwise position, allowing the sensing pins 50 to move upwardly through a hole in the tape 52 by rotation of the interposer or catch 49. Likewise, the restorer actuator has rotated to its counterclockwise position, spring 7 lifting the restorer frame 11 upwardly due to spring 23, releasing pressure of restorer frame 11 on the contact slides 15. Likewise, the reset rocker 3 has moved to its extreme clockwise position, releasing its pressure on translator slides 19, allowing any that would be unlatched by the upward motion of a pin and interposer to move to the left through the pull of a spring like 17. In the actual case shown on FIG. 1, there are no holes in the tape, therefore, all sensing pins 50 are not allowed to move upward, thus latching all translator slides 19 by the action of the interposers 49, restraining the translator slides 19 in their extreme right hand position. This position aligns the notches on the translator slides 19 located at station 19 allowing the contact slide 15 also located at station 19 to be forced upward into these notches by the spring tension of the associated stacking switch 5. This would signal that a "Blank" tape is being read in the reader.

Figure 7:
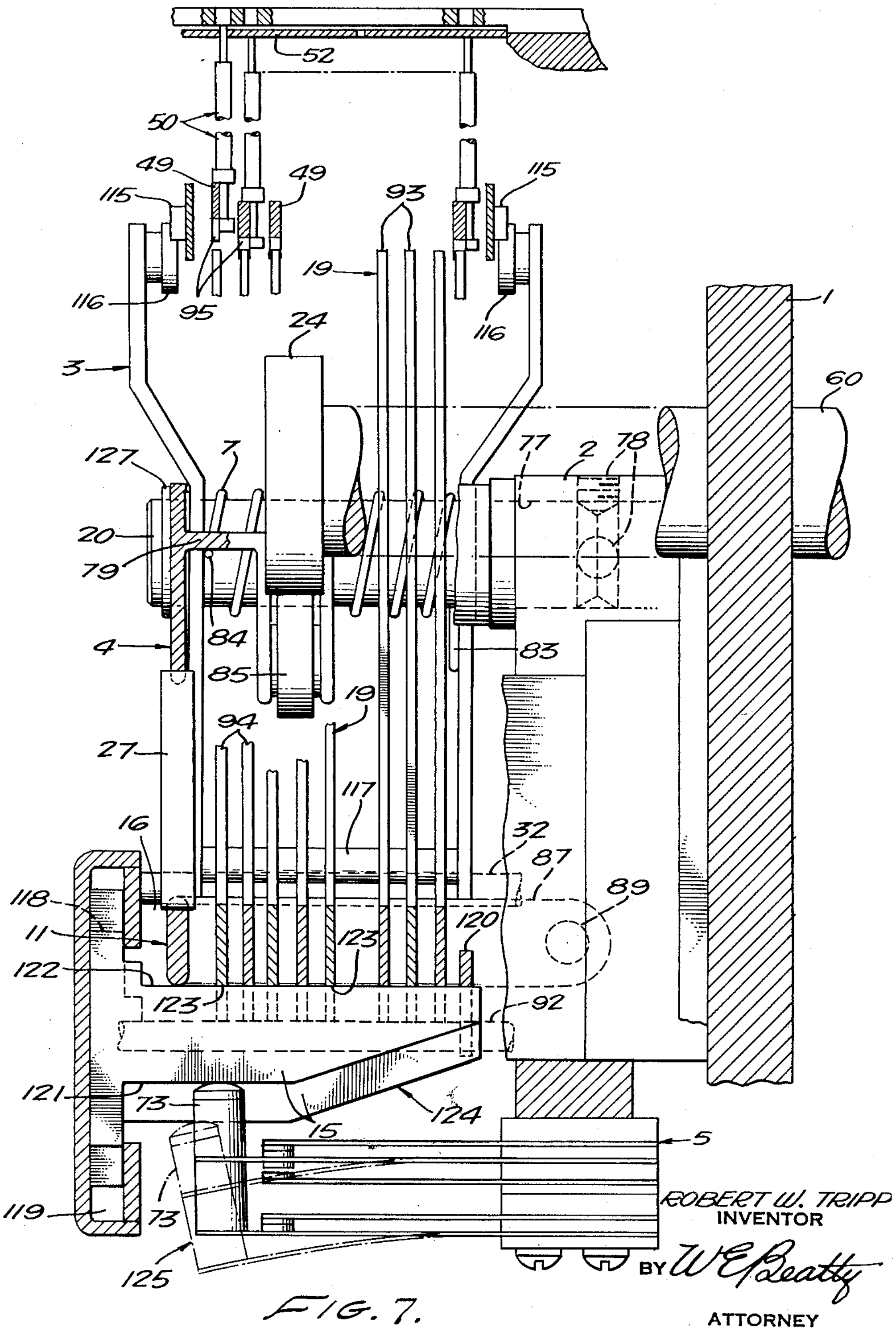
FIG. 7 is a cross sectional view on broken line 7—7 of FIG. 13 at the location of the "period" slots in the translator slides, this location being indicated by the line marked 7 in FIG. 13.
Figure 16:
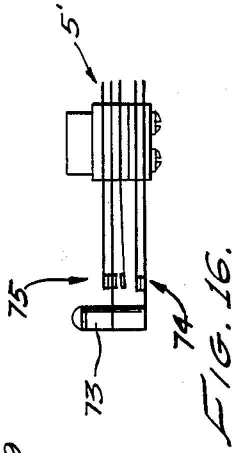
FIG. 16 is a detail of one stacking switch shown in its relaxed condition, that is the contact slide has engaged the notches in the translator slides and the stacking switch is reading this station.

The action of the stacking switch 5 upon the contact slide 15 can be more clearly seen in FIG. 7 wherein contact slide 15 is shown in two positions as is the stacking switch 5. The up position indicates a station being read, and corresponds to the throw of a swinger shown in FIG. 17 to the left. Each stacking switch like 5' in the assembly 5, as shown in FIG. 16, includes a form B switch indicated at 74 in FIG. 16 which is a single-pole, single-throw switch, with a normally closed contact only and a form C switch indicated at 75 which is a single-pole, double-throw switch containing a normally closed and a normally open contact. Each stacking switch 5' has an operating button like 73 in FIG. 6. Contrary to usual practice, each stacking switch 5' is held in idle position against its spring action and moves to its alternate active position when released. For each of the twenty switch operating buttons 73 is provided a contact slide like 15 in FIG. 7.

The slides 15 extend below and transversely of the eight translator slides in the group indicated at 19, being slidably supported by upper and lower front combs 118 and 119, also by a back comb 120 . As shown in FIG. 7, the bottom edge like 121 of each contact slide 15 rests on the top of its switch button 73, and the top edge like 122 of each contact slide 15 at certain times bears against the bottom edge of the translator slides 19 when their notches 123 are staggered with all unwanted contact slides in the position shown at 124 in FIG. 7, whereas a particular wanted contact slide 15 at that time is moved to elevated position by the spring action of its switch 5' to decode by its operation, the information stored in a particular hole or combination of holes in a row in the tape. When the contact slide is held in its lower idle position, the switch 5' is in its lower position as shown at 125 in FIG. 7.

The operation of the mechanism is as follows:

Referring to FIG. 17, the tape reader is operated by switching the Off-Load-Run switch 70 to the Run position. This energizes the tape motor 6 to the 115-volt line 62 which motor will run continuously during the use of the tape reader.

It will be noted in FIG. 18 that the motor 6 drives the tape reader shaft 60 through a belt and pulley arrangement 33, and that the pulleys 34 mounted on the tape reader drive shaft 60 is attached to this shaft through a slip-clutch 35 so that if this shaft were latched, the motor 6 could continue to run, without stalling, through the slippage of this clutch 35. The tape reader action is a 2 step affair, being automatically latched every half turn, that is at 0° and 180°. This is performed by the operation of the latch lever 36 and latch 37 in FIG. 18 which operates whenever the latch coil 38 is de-energized, the latch lever 36 turning clockwise and engaging the latch 37, halting the rotation of the drive shaft 60. The latch 37 is energized as shown every ½ revolution. The remaining cams shown in FIG. 18 are solidly mounted to the drive shaft 60 and rotate with it as shown. FIG. 18 shows the relative positions of all members at the 180° position with the latch lever 36 engaged to the latch 37.

The latch coil 38 can be energized at either the 0° or 180° as follows:

Referring to FIG. 17, one side of the latch coil 38 is permanently connected to the +24 volts buss 63 and is energized to the ground buss 64 as follows: At 0° the "0° Cam" contacts 39 of the 0° cam 128 are closed, allowing the ground side of the latch coil 38 to be connected to ground through the 0° contacts, through the normally closed contacts of the "Tight Tape" 58 and "No Tape" 21 switches, and through the swinger of the Off-Load-Run switch 70. Thus, in this description, whenever the cams are rotated to the 0° position, they automatically step off this position through the action of the "0° Contacts" 39. At the 180° position, the latch coil 38 is energized to ground by the ground side of the latch coil 38 proceeding through the contacts 40 of the "180° Cam" 129 and directly to the swinger of the Off-Run-Load Switch 70, and then through the Advance Switch 67 to the ground buss 64. Thus, with the Advance Switch 67 in the open position, the tape reader will automatically stop at 180°, and not until the operator pushes the Advance Switch 67 closed momentarily, would the latch coil 38 be energized, allowing the tape reader drive shaft 60 to rotate.

When the tape reader is latched at the 180° position, it is in position to read the hole combination in the tape. Referring to FIG. 17 in this instance, one of the contacts shown and numbered 1 through 9, 0, Tab, +, —, E, S, CR, Delete, Blank, Decimal Point, in the switch group 66, will be actuated (left motion), allowing a corresponding light in the blank 41 to be energized. The operation is as follows: The +24 volt buss 63 is connected to one side of all lights in the bank 41. The ground buss 64 proceeds through the contacts 42 of the "Early Cam" 44 which are made at 180° to the swingers of the 1 through 9 and "0" switches indicated at 65, so that if any of them are closed, the circuit is completed to the corresponding light below in the bank 41. In like manner, the ground buss 64 proceeds through the contacts 43 of the "Late Cam" 71 to the double throw swinger of the energized switch in the switch group 66 and energizes the number light 46 in the buss 68. If no number is coded, then this ground buss 64 proceeds through the first 10 double throw switches in the group 66 and energizes the corresponding alphabetical light such as Tab, +, —, or the rest in the bank 65. If no switch is thrown, it is an indication that something has gone wrong, and the same ground buss 64 then proceeds through all 19 double throw switches in the group 66 and energizes the Error Light 47.

After a position has been decoded and the operator is satisfied and wishes to read the next combination of holes on the tape, he momentarily presses the Advance Switch 67, which causes the tape reader to make one complete rotation as described above, arriving at 180° again and reading the new set of tape holes.

Figure 15:
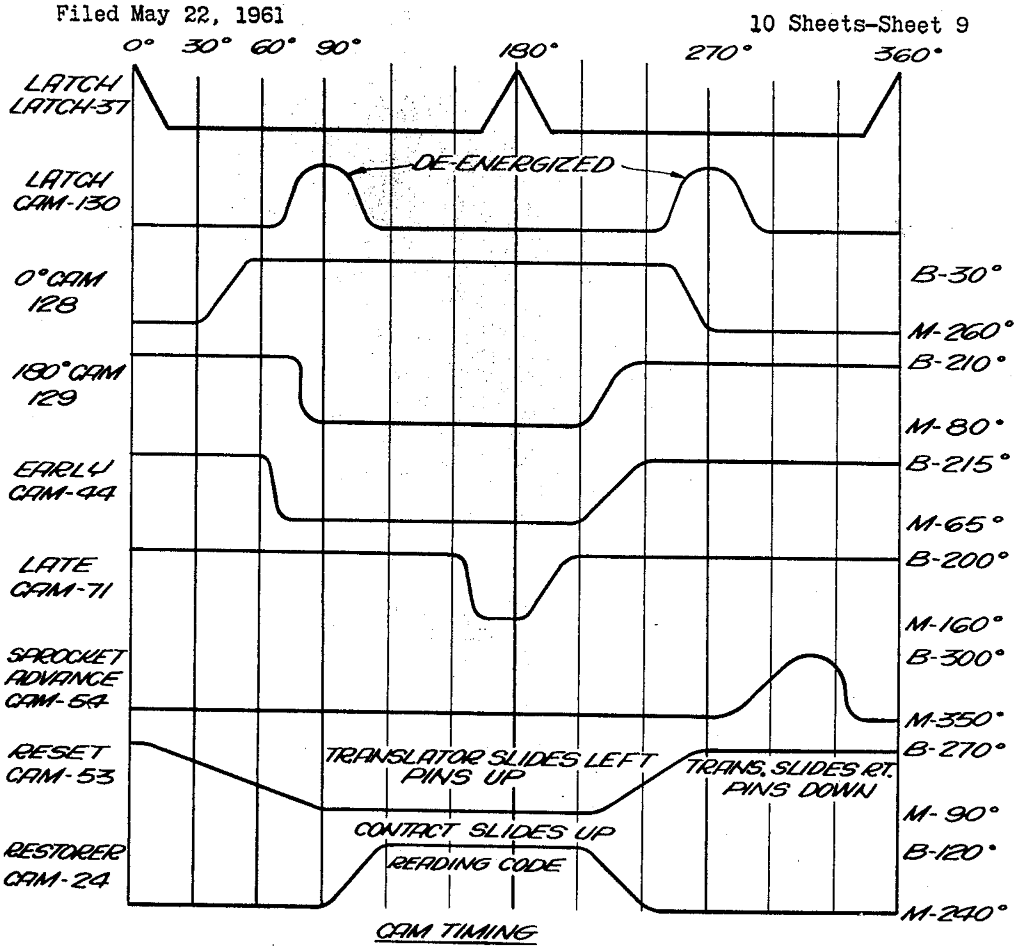
FIG. 15 is a timing chart for the various cams and latches attached to the drive shaft of the tape reader.

The decoding action of the tape reader is performed by various cams and actuating mechanisms during the rotation of the drive shaft from its starting position at 0° to its final position at 180°. The cam timing is shown in FIG. 15. The main action is performed by the Sprocket Advance Cam 54, the Reset Cam 53, and the Restorer Cam 24. The end result is the actuation of the stacking switches in the switch assembly 5, see FIGS. 7, 16, and 17, by the insertion of one of the contact slides in the group 15, see FIGS. 1, 3, 7 and 12, into aligned slots like the "Period" slots in FIG. 8 or the "Tab" slots in FIG. 9 in the translator slides in the group 19. There is one contact slide and one stacking switch like 5′ in the assembly 5 for each stage to be read, that is 19 in this case, station 11 in FIG. 11 being a spare.

While the lamps 1 to 0 and also Tab to Error have been shown in FIG. 17, they are representative of other signaling devices which may be employed. For example, in the Patent 2,849,668 referred to above, FIG. 4 and other figures show in the block No. 4, seven different leads marked 10 to 16 representing outputs of different values which may be taken from a tape reader. The leads of this type may extend from or be substituted for the lamps marked 1 to 0 in FIG. 17, while the other control circuits may be employed to control various machine operations, for example "Tab" translates a code in the tape to advance to the next block of information on completion of a given block, + controls advance; — controls reverse movement, "E" is end of a series of commands, "S" is stop, "CR" is carriage return, "Delete" cancels a hole intended to be omitted, "Blank" operates a control to automatically advance blank tape, etc.

As shown in FIG. 15, the timing of the various cams in FIG. 17 is as follows:

180° Clutch Latch 37 In Place-Pins Up-Read
200° Break Late Cam 71
210° Break 180° Cam 129
215° Break Early Cam 44
240° Roller 85 and thus Restorer Arm 4 Full Down
260° Make 0° Cam 128
270° Roller 114 and thus Reset Arm 48 Full Up-Operate Latch Cam
300° Start Tape Advance
350° Complete Tape Advance
0° Clutch Latch 37 In Place
30° Break 0° Cam 128
65° Make Early Cam 44
80° Make 180° Cam 129
90° Reset Arm 48 Full Down-Operate Latch Cam
120° Restorer Arm 4 Full Up
160° Make Late Cam 71

In FIG. 2, the mechanism for advancing the tape 52 is well known and includes cam 54 which acts on roller 96 on arm 59 pivoted at 97 and having pawl 98 which operates ratchet wheel 99 on the same shaft as the sprocket 51 for the tape 52. The "No Tape" actuator 55 has an underhang 100 which is urged against the underside of the tape by spring 101. Actuator 55 is pivoted at 102 and has an arm 103 which actuates switch 21 in the absence of tape.

Figures 4, 5, 6:
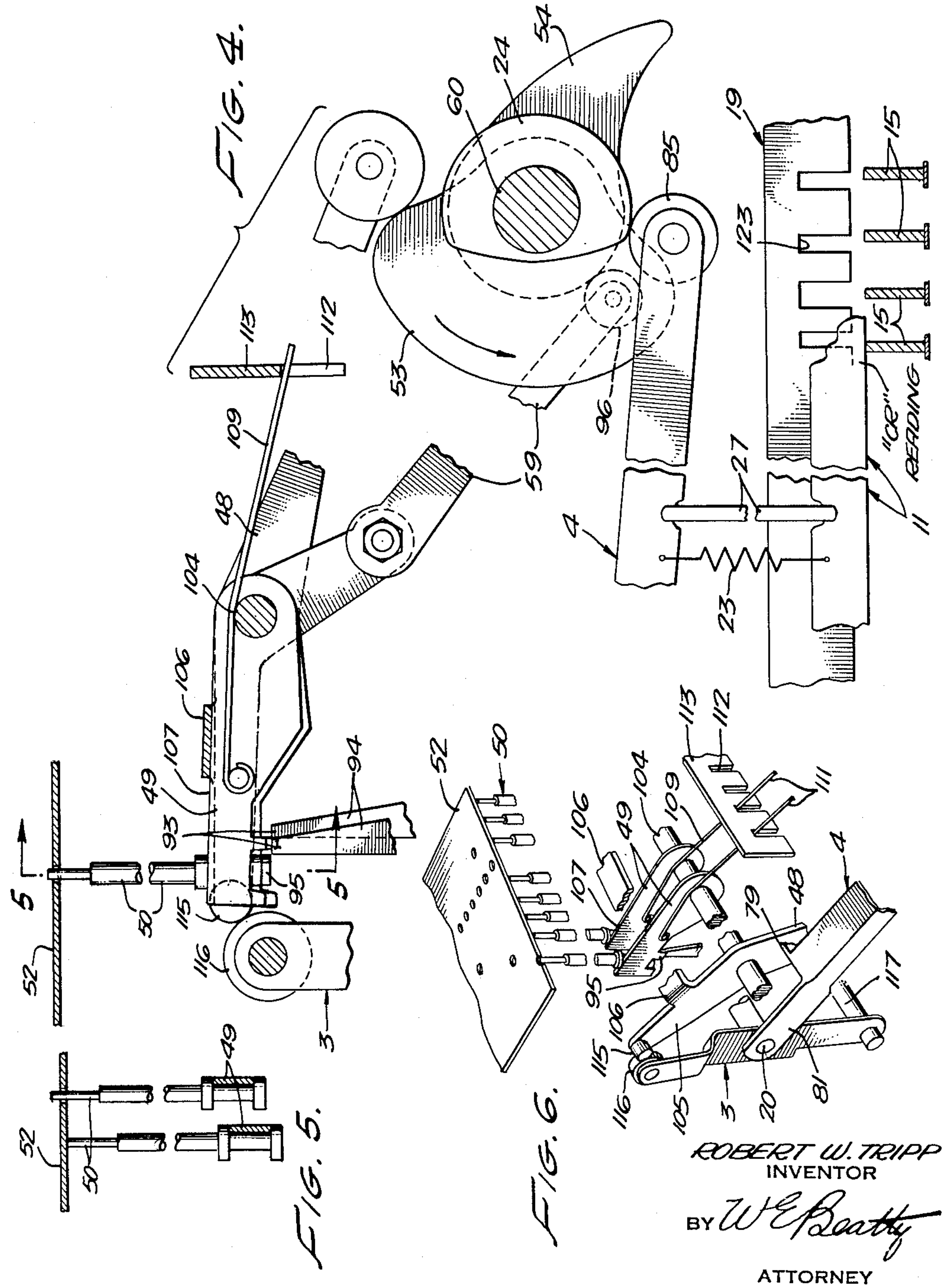
FIG. 4 is an enlarged vertical sectional view of the actions of the restorer cam, restorer arm, reset cam, reset arm, sprocket advance cam, sensing pins and the like at a position which is slightly counterclockwise from position in FIG. 3, that is 20°, showing a sensing pin encountering a hole in the tape and the corresponding catch released.
FIG. 5 is a sectional view on line 5—5 of FIG. 4 showing details of the sensing pins with their relative positions when withdrawn from the tape holes, and when inserted.
FIG. 6 is a perspective view with parts broken away showing the detail of sensing pins, rocker arm, interposers or catches and springs and reset arm in the same position of tape reader cycle as FIG. 4.

Referring to FIGS. 6 and 12, the reset arm 48 is pivoted at 104 and the top of its outer end 105 has an overhang 106 which extends over the arms like 107, each of which carries one of the sensing pins 50 at its outer end. Each of the last mentioned arms 107 is pivoted on the shaft 104 and each such arm and its pin is urged upwardly by the spring like 109 which is tensioned at its intermediate portion over shaft 104, spring 109 having one fixed end 110 fastened to the arm 107, its opposite end 111 being held in position by a slot 112 in a comb 113. The reset cam 53 acts on roller 114 on arm 48, see FIG. 12, whereby its overhang 106 retracts the sensing pins 50, the outer end of the arm 105 having a pin 115, see FIG. 12, which acts on the roller 116 at the upper end of the reset rocker 3 which pivots on shaft 20, roller 116 moving to the left to move cross bar 117 at its lower end to the right against the action of spring 45, the bar 117 bearing on the slides 19, to urge them to the right. As shown in FIG. 7 the reset rocker 3 in fact includes a pair of spaced rollers like 116 which engage a pair of corresponding pins like 115, the latter being mounted respectively on spaced arms like the ones shown at 115 in FIG. 6.

Should the tape reader drive shaft 60 start to rotate by action of the operator pressing the advance switch 67 as described above, the mechanism would operate as follows: Referring to FIG. 1, the drive shaft 60 would rotate counterclockwise from its shown position at 180°, proceeding to the 240° position. The restorer cam 24 will have caused the restorer arm 4 to move clockwise and down to its fullest extent, which action pushes the restorer frame 11 down through push rod 27. The restorer frame 11 likewise engages the 19 shown contact slides 15 and pushes any that had been inserted in the translator slots 123 out of these slots (down). Thus any translator slides 19 which may later be required to move left or right are free to do so. The shaft 60 continues to rotate counterclockwise, and at 270° the reset cam 53 has caused the reset arm 48 to rotate to its full counterclockwise position, which engages at its left extremity the reset rocker 3, causing it to rotate counterclockwise about shaft 20. The lower extremity of the reset rocker 3 is caused thusly to engage the translator slides 19 and push them all to their extreme right position. In addition, the reset arm 48 having rotated counterclockwise, withdraws the sensing pins 50 from the holes in the tape, and interposers 49 latch the upper extremity of the translator slides 19 in their extreme right position.

As the shaft 60 continues to rotate, at 300° the tape advance cam 54, as shown in FIG. 2, has caused the sprocket advance actuator 59 to rotate clockwise, driving the ratchet 99 and sprocket 51. With the continuance of the shaft rotation, the sprocket 51 will rotate clockwise due to the before mentioned action until 350° has been reached, at which angle the sprocket has made a sufficient rotation to be latched by sprocket latch 56, thus bringing the next set of holes in the tape 52 into position for reading.

At 0° the latch lever 36 would engage the latch 37, halting the rotation of the shaft 60. However, due to the action of the 0° cam contacts 39 described above, the latch coil 38 is energized at this position, removing the latch lever 36 from engagement with the latch 37 and allowing the shaft 60 to continue its counterclockwise rotation. This position is shown in FIG. 3.

Referring to FIG. 12 and to enlarged details in FIGS. 4, 5 and 6, the mechanism is shown just after the shaft 60 has rotated from the 0° position. It will be seen that the reset arm 48 is beginning to move clockwise by action of the reset cam 53, thus beginning to release the latching action of the interposers 49 upon the translator slides 19, and at the same time lifting the sensing pins 50 into position so that they can engage any holes in the tape. The left extremity of the reset arm 48 is moving up and clockwise thus allowing the reset rocker 3 to rotate clockwise, which disengages its pressure at its lower extremity upon the translator slides 19. Thus, if a pin has engaged a hole in the tape, and its corresponding interposer 49 has lifted, this unlatches the corresponding translator slide 19, which in turn will be pulled to the left by its corresponding spring 17. The notches 123 in the translator slides are brought into alignment at the station which corresponds to the coded array of holes in the tape. In FIGS. 12, 4, 5 and 6, this coded array is shown as the array corresponding to "CR," and referring to FIG. 11, it will be seen that there is one right hand notch X in slide #8, and left hand notches 0 in slides 1 through 7. As shown in FIG. 6, only the hole at position #8 has been punched on the tape, thus the sensing pin 50 at only the 8th position has risen and engaged this hole, thus only #8 interposer 49 has unlatched a translator slide 19, which again is translator slide #8. Thus, only #8 translator slide 19 has moved left, causing its slot 123 to align with the slots 123 in the other 7 unmoved translator slides 19 and the contact slide 15 at station 17, or "CR."

At the 90° rotation of shaft 60 this action has been completed.

As the shaft 60 continues to rotate, restorer cam 24 releases restorer arm 4 which action is complete at the 120° rotational position. At this position, the restorer arm 4 has moved to its extreme counterclockwise position (up), pulling the restorer frame 11 up through action of spring 23. The restorer frame 11 had engaged the top of all the contact slides 15, and now, being pulled up, has released its pressure upon them. Since only the slots in the translator slides 19 at position 17 are aligned, only the contact slide at position 17 can move upwardly into these aligned slots 123. Thus, only "CR" is read and stacking switches 5 in FIG. 17 located at "CR" are energized by upward movement of the corresponding switch button 73 which corresponds to swinger movement to the left in FIG. 17.

The tape reader shaft 60 continues to rotate counterclockwise until it once again is stopped by the action of the clutch latch lever 36, at 180°, engaging the clutch latch 37 as shown in FIG. 18.

With reference to FIG. 1, the action of the tight tape switch 58 is shown so that, should the tape be jammed at its lower extremity, the tight tape actuator 57 will be rotated clockwise engaging the tight tape switch 58.

Likewise, the action of the No Tape switch 21 is shown in FIG. 2 where, should there be no tape in the instrument, actuator 55 would rotate clockwise and energize switch 21.

An advantage of this decoder is that the code can be readily changed by substituting one or more new translator slides for an existing slide or slides, the new ones having the "0" and "X" position slots 123 arranged to satisfy the new code or requirement.

While the invention has been described above as applied to a tape having 8 rows of holes and to a decoding mechanism arranged to have 20 decoding positions, 19 of which are shown active, and while a certain selection of characters is indicated utilizing a particular code, other choices of tape, code, number and selection of characters can be made without deviating from the spirit of the invention.

I claim:

1. A tape decoding multiple switch comprising a row of sensing pins, a corresponding series of parallel slides, one for each pin, a plurality of switch actuating stations spaced along said slides, means supporting said slides for movement from one position to another, certain of said slides having a transverse notch at one position and the other slides having a similar notch at the other position in accordance with a code, each of said switching stations having a switch actuating member extending transversely of said slides in position to enter the notches of all of said slides at that station or not depending on whether the notches are in alignment or not, all of said slides having notches receiving only the particular one of said switching members which is at the selected station, and all of said slides having imperforate portions restraining the switching members at all non-selected stations, means urging said slides to one of said positions, and means controlled by each of said pins for actuating its slide to the other position when the pin enters a hole in the tape.

2. A tape decoding multiple switch according to claim 1, means for restoring the actuated one of said switch members to its alternate position out of the aligned notches in said slides, and means for restoring each actuated slide to its said one position under control of its said pin.

3. In a tape decoding multiple switch, a number N of pin operated translator slides, means including pins for operating said slides to a number of relative positions greater than N, said slides having a station for each of said greater number of relative slide positions, each slide at each station having active and passive portions, said active portions being in alignment and providing a passage extending laterally through all of said slides only at the station selected by a particular code combination of said pins and said active portions being out of alignment at all other stations, an actuating member individual to each station, each actuating member being activated by the aligned active portions of all of said slides at a station and restrained from actuation by the passive slide portions at all other stations, and means urging said actuating members to active positions.

4. In a tape decoding multiple switch, according to claim 3, said actuating members being switch actuating members, and separate contact means controlled by each of said switch actuating members.

References Cited by the Examiner

UNITED STATES PATENTS

| | | | |
|---|---|---|---|
| 1,909,548 | 5/33 | Peirce | 235—61.11 |
| 2,454,628 | 11/48 | Braun | 209—110 |
| 2,577,070 | 12/51 | Cheney | 235—61.113 |
| 2,757,866 | 8/56 | Johnson | 235—61.113 |

ROBERT C. BAILEY, *Primary Examiner.*

WALTER W. BURNS, Jr., MALCOLM A. MORRISON, *Examiners.*